United States Patent
Kang et al.

(10) Patent No.: US 10,003,392 B2
(45) Date of Patent: Jun. 19, 2018

(54) METHOD FOR GENERATING CHANNEL STATE INFORMATION FOR THREE-DIMENSIONAL MIMO IN WIRELESS COMMUNICATION SYSTEM, AND DEVICE THEREFOR

(71) Applicant: LG ELECTRONICS INC., Seoul (KR)

(72) Inventors: Jiwon Kang, Seoul (KR); Bonghoe Kim, Seoul (KR); Sunam Kim, Seoul (KR); Kitae Kim, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

(21) Appl. No.: 15/532,946

(22) PCT Filed: Jun. 24, 2015

(86) PCT No.: PCT/KR2015/006424
§ 371 (c)(1),
(2) Date: Jun. 2, 2017

(87) PCT Pub. No.: WO2016/153112
PCT Pub. Date: Sep. 29, 2016

(65) Prior Publication Data
US 2017/0346540 A1 Nov. 30, 2017

Related U.S. Application Data

(60) Provisional application No. 62/135,724, filed on Mar. 20, 2015.

(51) Int. Cl.
*H04B 7/06* (2006.01)
*H04L 5/00* (2006.01)
*H04B 7/0413* (2017.01)

(52) U.S. Cl.
CPC ......... *H04B 7/0626* (2013.01); *H04L 5/0048* (2013.01); *H04L 5/0057* (2013.01); *H04B 7/0413* (2013.01); *H04B 7/0619* (2013.01)

(58) Field of Classification Search
CPC .. H04B 7/0626; H04B 7/0413; H04B 7/0619; H04L 5/0048; H04L 5/0057
See application file for complete search history.

(56) References Cited

U.S. PATENT DOCUMENTS

| | | | |
|---|---|---|---|
| 2008/0187030 A1* | 8/2008 | Khan | H04B 7/0417 375/219 |
| 2012/0052895 A1* | 3/2012 | Clerckx | H04W 72/0426 455/509 |

(Continued)

OTHER PUBLICATIONS

PCT International Application No. PCT/KR2015/006424, Notification of Transmittal of the International Search Report and the Written Opinion of the International Searching Authority, or Declaration dated Dec. 23, 2015, 10 pages.

(Continued)

*Primary Examiner* — Syed Haider
(74) *Attorney, Agent, or Firm* — Lee Hong Degerman Kang Waimey

(57) ABSTRACT

Disclosed in the present application is a method by which a terminal generates channel state information for multi-antenna-based beamforming in a wireless communication system. Specifically, the method comprises the steps of: receiving a first pilot signal and a second pilot signal from a base station; selecting a first rank on the basis of the first pilot signal and selecting a second rank on the basis of the second pilot signal; setting a rank search range for a three-dimensional channel on the basis of the first rank and the second rank; and selecting a rank for the three-dimensional channel within the rank search range and a precoder corresponding to the rank for the three-dimensional channel.

6 Claims, 14 Drawing Sheets

(56) References Cited

U.S. PATENT DOCUMENTS

2013/0258964 A1    10/2013  Nam et al.
2013/0308714 A1    11/2013  Xu et al.
2013/0308715 A1*   11/2013  Nam .................... H04B 7/0469
                                                     375/267
2014/0079100 A1     3/2014  Kim et al.

OTHER PUBLICATIONS

ZTE, "Enhanced Vertical/Horizontal Feedback Scheme for EB/FD-MIMO", 3GPP TSG RAN WG1 Meeting #80, R1-150161, Feb. 2015, 5 pages.
NEC, "CSI Feedback Enhancement for Elevation Beamforming/FD-MIMO", 3GPP TSG RAN WG1 Meeting #80, R1-150300, Feb. 2015, 3 pages.

* cited by examiner

FIG. 2
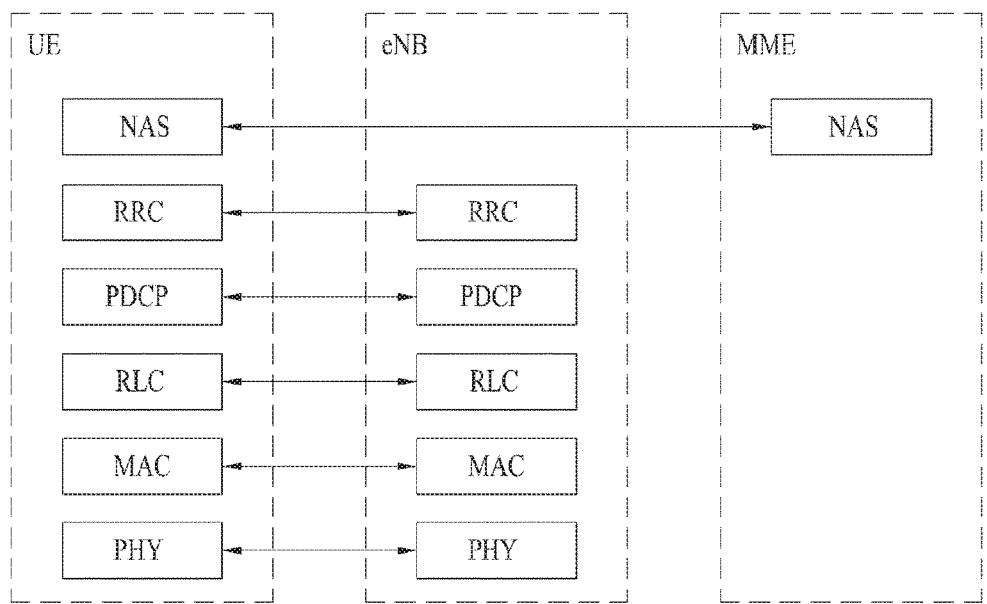
(A) CONTROL-PLANE PROTOCOL STACK
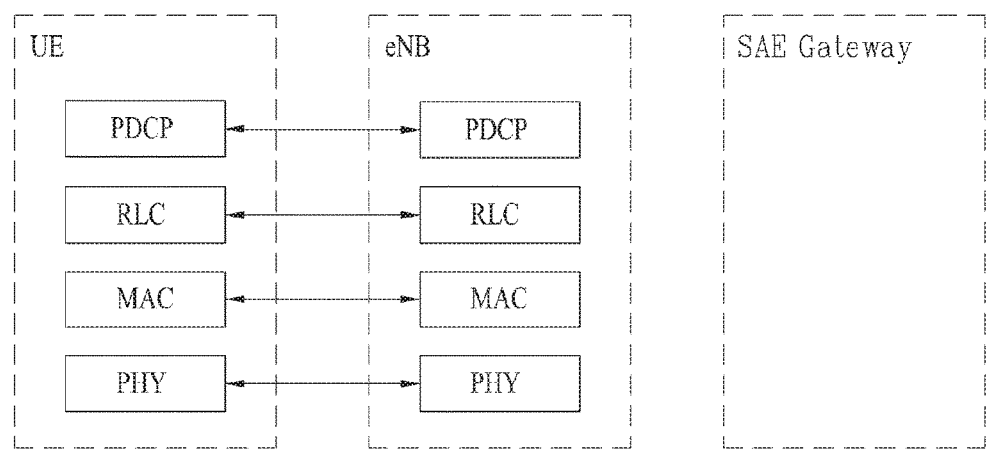
(B) USER-PLANE PROTOCOL STACK

▨ : DMRS GROUP 1

▩ : DMRS GROUP 2

(a) CONVENTIONAL ANTENNA SYSTEM (b) AAS

METHOD FOR GENERATING CHANNEL STATE INFORMATION FOR THREE-DIMENSIONAL MIMO IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2015/006424, filed on Jun. 24, 2015, which claims the benefit of U.S. Provisional Application No. 62/135,724, filed on Mar. 20, 2015, the contents of which are all hereby incorporated by reference herein in its entirety.

TECHNICAL FIELD

The present invention relates to a wireless communication system and, more particularly, to a method of generating channel state information for three-dimensional multiple input multiple output (MIMO) in a wireless communication system and a device therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies in a method of generating channel state information for three-dimensional multiple input multiple output (MIMO) in a wireless communication system and a device therefor.

Technical Solution

The object of the present invention can be achieved by providing a method of, at a user equipment (UE), generating channel state information for multiple input multiple output (MIMO) based beamforming in a wireless communication system including receiving a first pilot signal and a second pilot signal from a base station, selecting a first rank based on the first pilot signal and selecting a second rank based on the second pilot signal, configuring a rank search range for a three-dimensional (3D) channel based on the first rank and the second rank, and selecting a rank for the 3D channel and a precoder corresponding to the rank for the 3D channel within the rank search range.

In the rank search range for the 3D channel, the larger value of the first rank and the second rank may be set as a lower limit and a product of the first rank and the second rank may be set as an upper limit.

In the rank search range for the 3D channel, the larger value of the first rank and the second rank may be set as a lower limit and the smaller value of a product of the first rank and the second rank and a maximally implementable rank of the UE may be set as an upper limit.

In another aspect of the present invention, provided herein is a user equipment (UE) device in a wireless communication system including a wireless communication module configured to receive a first pilot signal and a second pilot signal from a base station, a processor configured to select a first rank based on the first pilot signal and selecting a second rank based on the second pilot signal, wherein the processor configures a rank search range for a three-dimensional (3D) channel based on the first rank and the second rank and selects a rank for the 3D channel and a precoder corresponding to the rank for the 3D channel within the rank search range.

The processor may configure the rank search range for the 3D channel, such that the larger value of the first rank and the second rank is set as a lower limit and a product of the first rank and the second rank is set as an upper limit.

The processor may configure the rank search range for the 3D channel, such that the larger value of the first rank and the second rank is set as a lower limit and the smaller value of a product of the first rank and the second rank and a maximally implementable rank of the UE is set as an upper limit.

The first pilot signal and the second pilot signal may correspond to a vertical-direction channel and a horizontal-direction channel, respectively.

A channel quality indicator may be calculated on the assumption that the rank for the 3D channel and the precoder corresponding to the rank for the 3D channel are applied, and the channel state information reported from the UE device to the base station may include the rank for the 3D channel, the precoder corresponding to the rank for the 3D channel and the channel quality indicator.

Advantageous Effects

According to the present invention, it is possible to efficiently generate and report channel state information for three-dimensional multiple input multiple output (MIMO) in a wireless communication system.

It will be appreciated by persons skilled in the art that the effects that can be achieved with the present disclosure are not limited to what has been particularly described hereinabove and other advantages of the present disclosure will be more clearly understood from the following detailed description.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

BEST MODE

Figure 1:
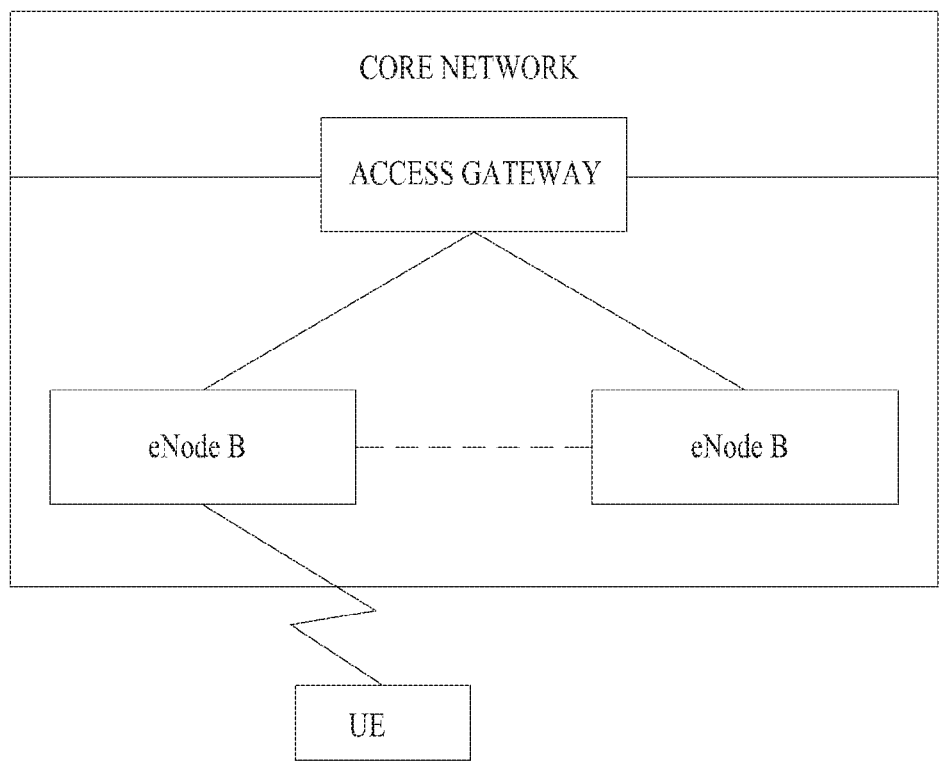
FIG. 1 illustrates a configuration of an Evolved Universal Mobile Telecommunications System (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
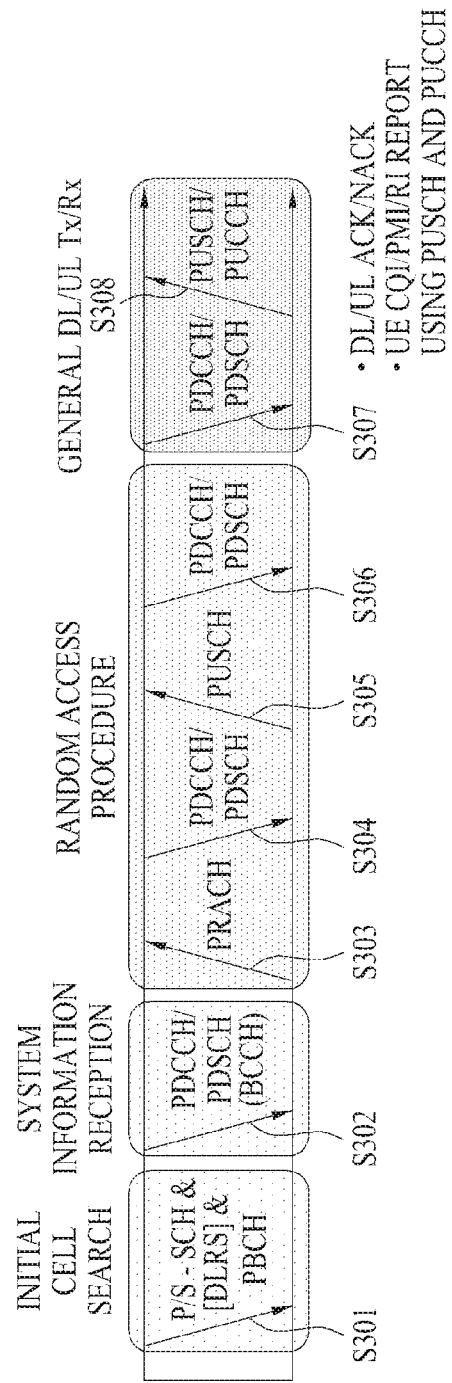
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (SR-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
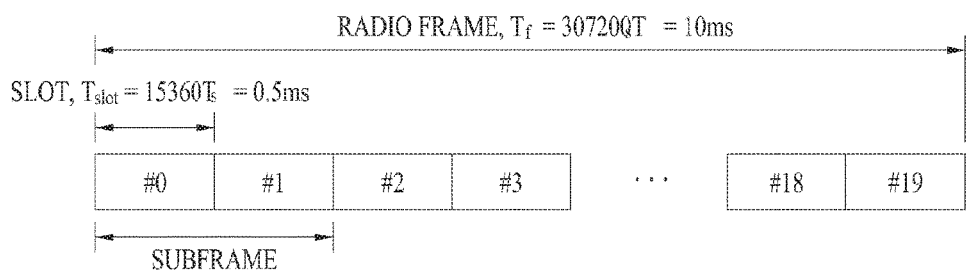
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15 \text{ kHz}\times2048)=3.2552\times10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
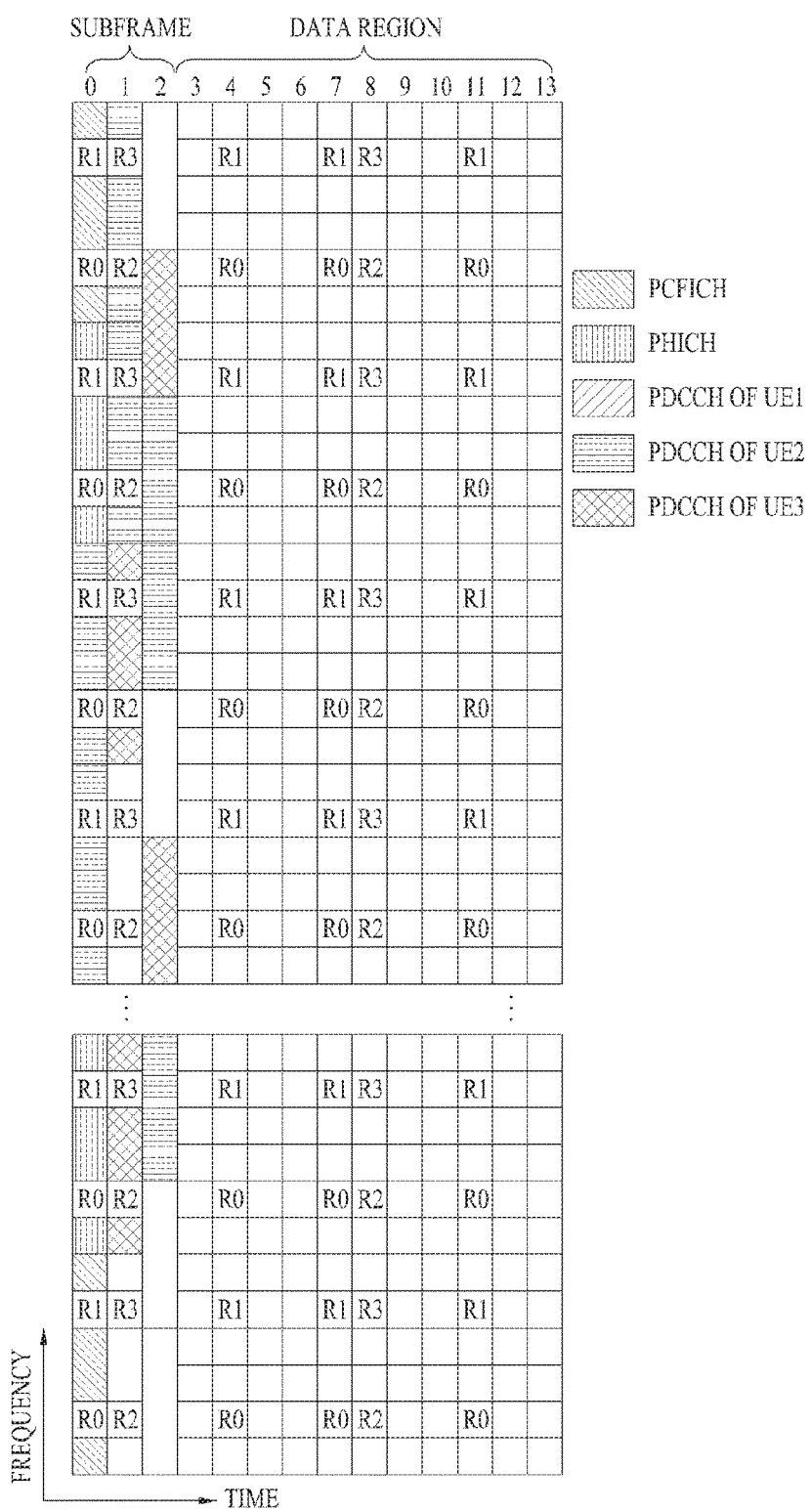
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
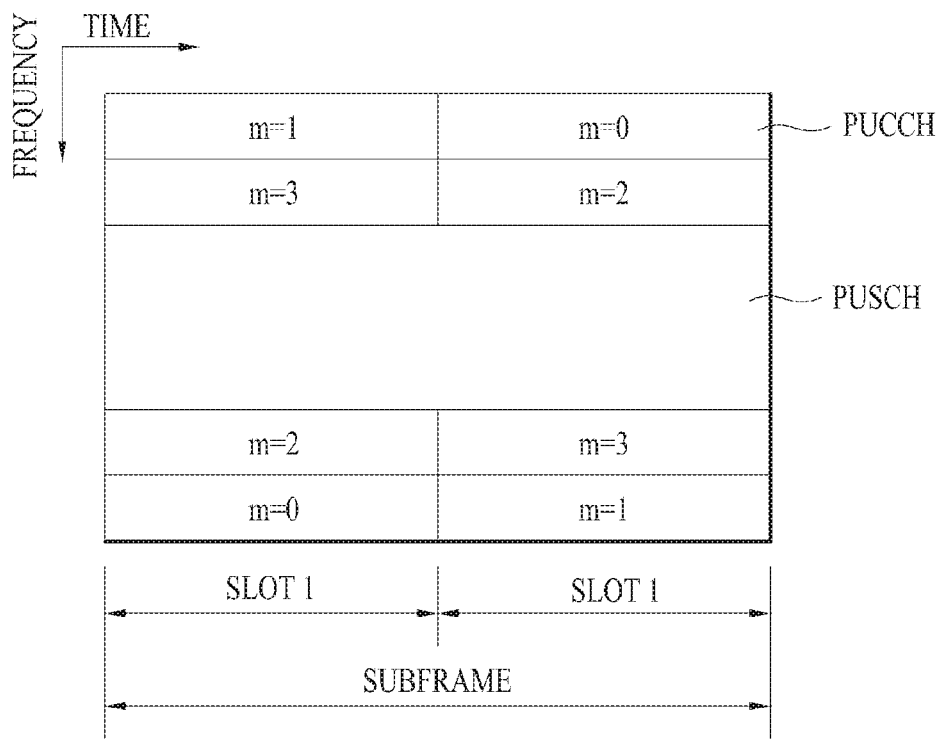
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
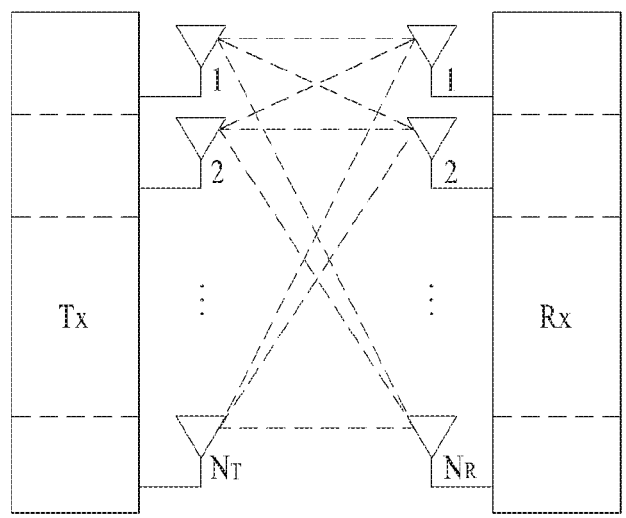
FIG. 7 illustrates a configuration of a general Multiple Input Multiple Output (MIMO) communication system.

FIG. 7 illustrates the configuration of a typical MIMO communication system. A transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R)$$ [Equation 1]

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T$$ [Equation 2]

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

$N_T$ transmission signals $x_1, x_2, \ldots x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank (H) satisfies the following constraint.

$$\text{rank}(H) \leq \min(N_T, N_R)$$

[Equation 6]

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by [Equation 7].

$$\text{\# of streams} \leq \text{rank}(H) \leq \min(N_T, N_R)$$

[Equation 7]

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Hereinbelow, a description will be given of channel state information (CSI) reporting. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

The current 3GPP standard defines modulation orders and cording rates for respective CQI indexes as illustrated in [Table 1].

TABLE 1

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
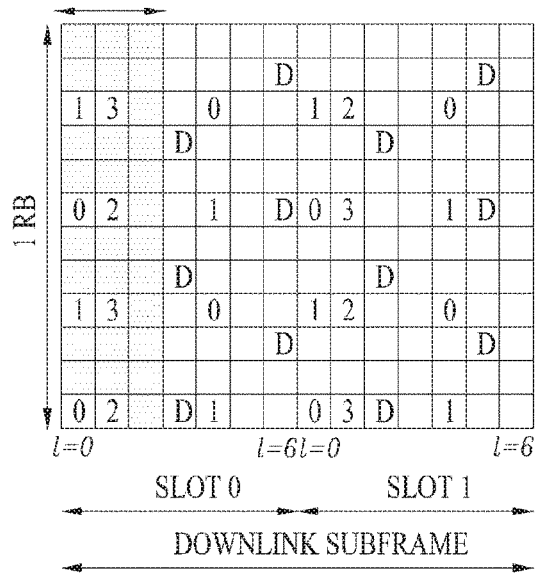
FIGS. 8 and 9 illustrate downlink Reference Signal (RS) configurations in an LTE system supporting downlink transmission through four antennas.
Figure 9:
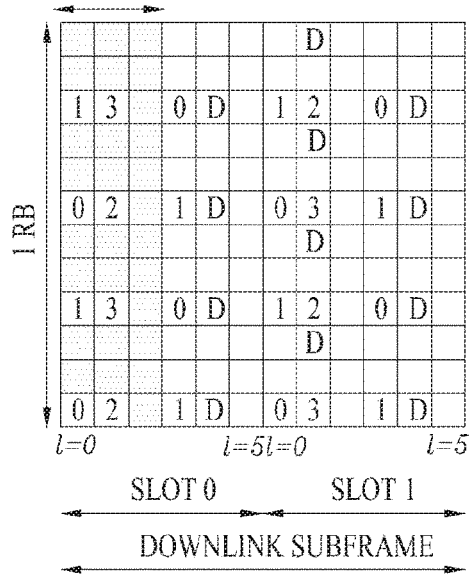

FIGS. 8 and 9 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 8 and 9, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DM-RSs). The DM-RSs are transmitted in a data region, that is, on a PDSCH, supporting single-antenna port transmission. The existence or absence of a UE-specific RS, DM-RS is indicated to a UE by higher-layer signaling. In FIGS. 8 and 9, the DM-RSs are transmitted through antenna port 5. 3GPP TS 36.211 defines DM-RSs for a total of eight antenna ports, antenna port 7 to antenna port 14.

Figure 10:
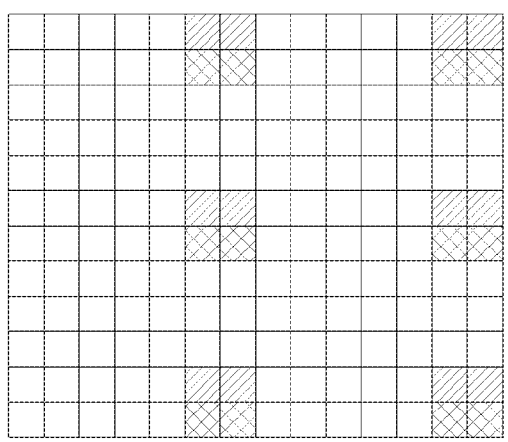
FIG. 10 illustrates an exemplary downlink Demodulation Reference Signal (DM-RS) allocation defined in a current 3GPP standard specification.

FIG. 10 illustrates an exemplary DL DM-RS allocation defined in a current 3GPP standard specification.

Referring to FIG. 10, DM-RSs for antenna ports 7, 8, 11, and 13 are mapped using sequences for the respective antenna ports in a first DM-RS group (DM-RS Group 1), whereas DM-RSs for antenna ports 9, 10, 12, and 14 are mapped using sequences for the respective antenna ports in a second DM-RS group (DM-RS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 2] lists CSI-RS configurations in the case of a normal CP and [Table 3] lists CSI-RS configurations in the case of an extended CP.

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |

TABLE 3-continued

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 2 only | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
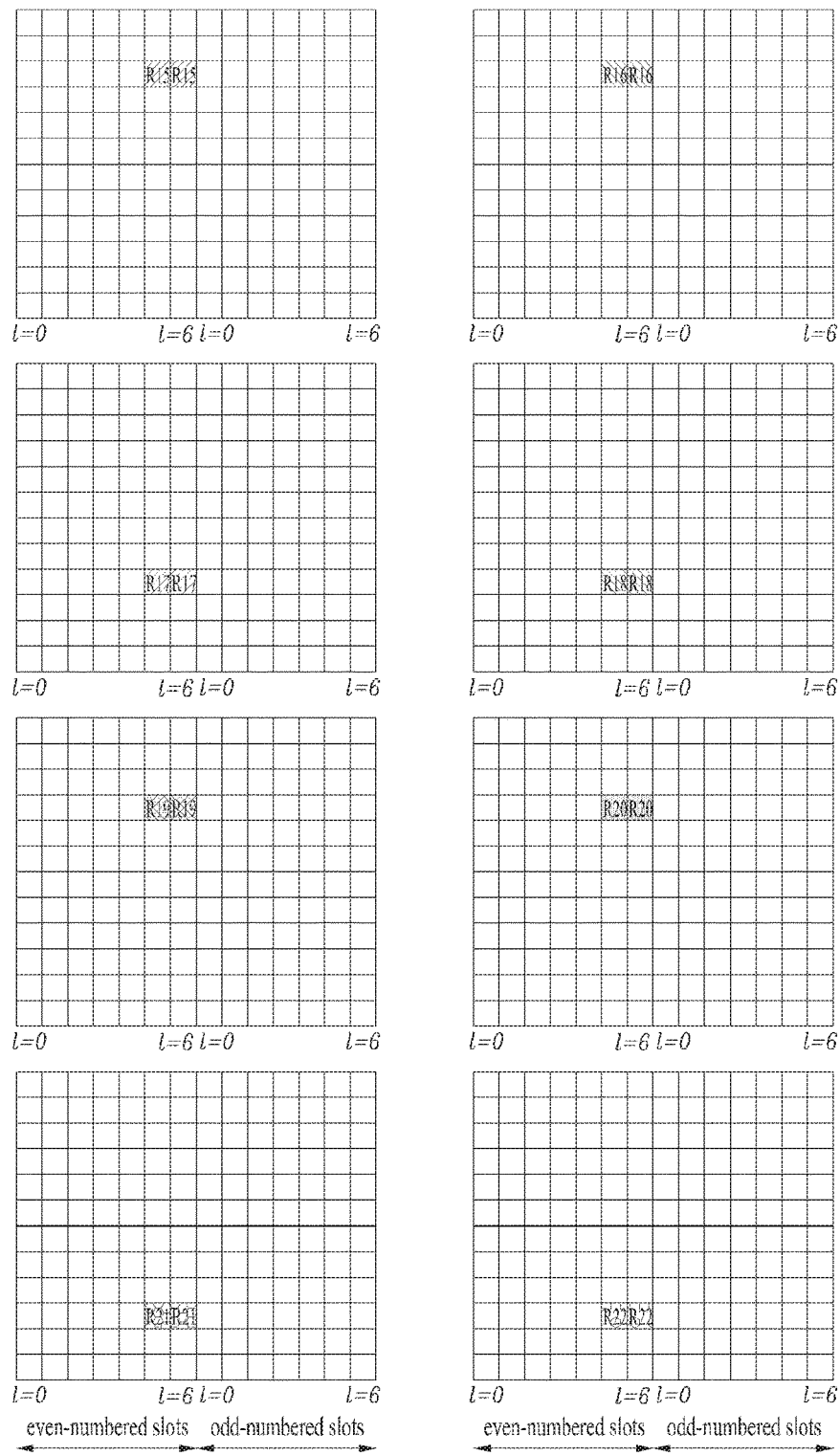
FIG. 11 illustrates Channel State Information-Reference Signal (CSI-RS) configuration #0 of downlink CSI-RS configurations defined in a current 3GPP standard specification.

In [Table 2] and [Table 3], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$. [Table 4] lists CSI-RS subframe configurations defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Information about a Zero Power (ZP) CSI-RS is transmitted in a CSI-RS-Config-r10 message configured as illustrated in [Table 5] by RRC layer signaling. Particularly, a ZP CSI-RS resource configuration includes zeroTxPowerSubframeConfig-r10 and a 16-bit bitmap, zeroTxPowerResourceConfigList-r10. zeroTxPowerSubframeConfig-r10 indicates the CS-RS transmission periodicity and subframe offset of a ZP CSI-RS by $I_{CSI-RS}$ illustrated in [Table 4]. zeroTxPowerResourceConfigList-r10 indicates a ZP CSI-RS configuration. The elements of this bitmap indicate the respective configurations written in the columns for four CSI-RS antenna ports in [Table 2] or [Table 3]. That is, the current 3GPP standard defines a ZP CSI-RS only for four CSI-RS antenna ports.

TABLE 5

```
-- ASN1START
CSI-RS-Config-r10 ::=    SEQUENCE {
    csi-RS-r10           CHOICE {
    ...
}
```

TABLE 5-continued

```
    zeroTxPowerCSI-RS-r10    CHOICE {
        release              NULL,
        setup                SEQUENCE {
            zeroTxPowerResourceConfigList-r10 BIT STRING
                (SIZE (16)),
            zeroTxPowerSubframeConfig-r10    INTEGER (0..154)
        }
    }
}
-- ASN1STOP
```

Now a description will be given of Quasi Co-Location (QCL).

If one antenna port is quasi co-located with another antenna port, this means that a UE may assume that the large-scale properties of a signal received from one of the antenna ports (or a radio channel corresponding to the antenna port) are wholly or partially identical to those of a signal received from the other antenna port (or a radio channel corresponding to the antenna port). The large-scale properties may include Doppler spread, Doppler shift, timing offset-related average delay, delay spread, average gain, etc.

According to the definition of QCL, the UE may not assume that antenna ports that are not quasi co-located with each other have the same large-scaled properties. Therefore, the UE should perform a tracking procedure independently for the respective antenna ports in order to the frequency offsets and timing offsets of the antenna ports.

On the other hand, the UE may performing the following operations regarding quasi co-located antenna ports.

1) The UE may apply the estimates of a radio channel corresponding to a specific antenna port in power-delay profile, delay spread, Doppler spectrum, and Doppler spread to Wiener filter parameters used in channel estimation of a radio channel corresponding another antenna port quasi co-located with the specific antenna port.

2) The UE may acquire time synchronization and frequency synchronization of the specific antenna port to the quasi co-located antenna port.

3) Finally, the UE may calculate the average of Reference Signal Received Power (RSRP) measurements of the quasi co-located antenna ports to be an average gain.

For example, it is assumed that upon receipt of DM-RS-based DL data channel scheduling information, for example, DCI format 2C on a PDCCH (or an Enhanced PDCCH (E-PDCCH)), the UE performs channel estimation on a PDSCH using a DM-RS sequence indicated by the scheduling information and then demodulates data.

In this case, if an antenna port configured for a DM-RS used in DL data channel estimation is quasi co-located with an antenna port for an antenna port configured for a CRS of a serving cell, the UE may use estimated large-scale properties of a radio channel corresponding to the CRS antenna port in channel estimation of a radio channel corresponding to the DM-RS antenna port, thereby increasing the reception performance of the DM-RS-based DL data channel.

Likewise, if the DM-RS antenna port for DL data channel estimation is quasi co-located with the CSI-RS antenna port of the serving cell, the UE may use estimated large-scale properties of the radio channel corresponding to the CSI-RS antenna port in channel estimation of the radio channel corresponding to the DM-RS antenna port, thereby increasing the reception performance of the DM-RS-based DL data channel.

In LTE, it is regulated that when a DL signal is transmitted in Mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with respect to large-scale properties except average gain. This means that the same node transmits a physical channel and signals. On the other hand, QCL type B is defined such that up to four QCL modes are configured for each UE by a higher-layer message to enable CoMP transmission such as DPS or JT and a QCL mode to be used for DL signal transmission is indicated to the UE dynamically by DCI.

DPS transmission in the case of QCL type B will be described in greater detail.

If node #1 having N1 antenna ports transmits CSI-RS resource #1 and node #2 having N2 antenna ports transmits CSI-RS resource #2, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within the common overage of node #1 and node #2 by a higher-layer signal.

Then, the eNB may perform DPS by configuring QCL mode parameter set #1 for the UE when transmitting data (i.e. a PDSCH) to the UE through node #1 and QCL mode parameter set #2 for the UE when transmitting data to the UE through node #2 by DCI. If QCL mode parameter set #1 is configured for the UE, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An Active Antenna System (AAS) and Three-Dimensional (3D) beamforming will be described below.

In a legacy cellular system, an eNB reduces ICI and increases the throughput of UEs within a cell, for example, SINRs at the UEs by mechanical tilting or electrical tilting, which will be described below in greater detail.

Figure 12:
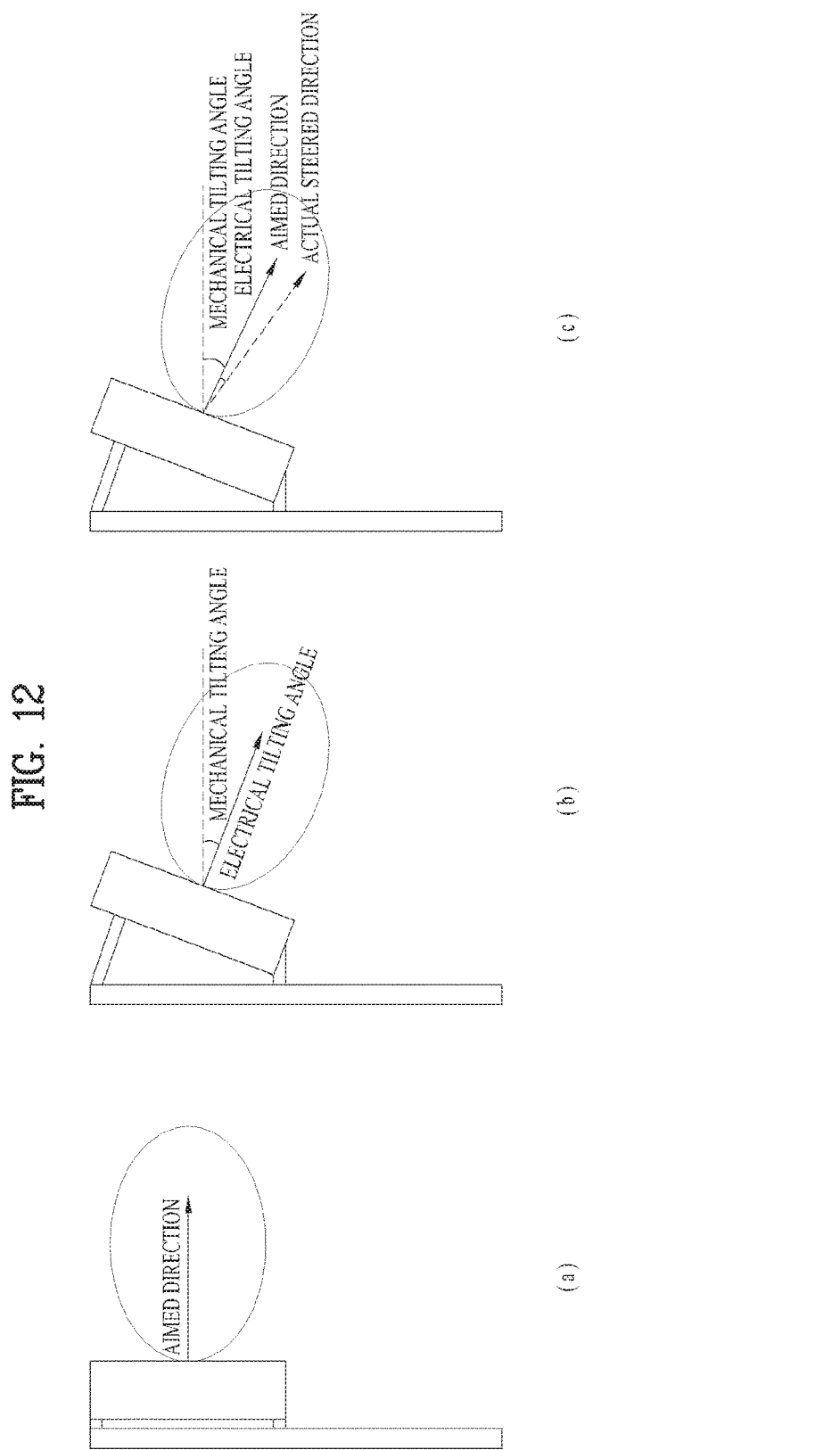
FIG. 12 illustrates antenna tilting schemes.

FIG. 12 illustrates antenna tilting schemes. Specifically, FIG. 12(a) illustrates an antenna configuration to which antenna tilting is not applied, FIG. 12(b) illustrates an antenna configuration to which mechanical tilting is applied, and FIG. 12(c) illustrates an antenna configuration to which both mechanical tilting and electrical titling are applied.

A comparison between FIGS. 12(a) and 12(b) reveals that mechanical tilting suffers from a fixed beam direction at initial antenna installation as illustrated in FIG. 12(b). On the other hand, electrical tilting allows only a very restrictive vertical beamforming due to cell-fixed tilting, despite the advantage of a tilting angle changeable through an internal phase shifter as illustrated in FIG. 12(c).

Figure 13:
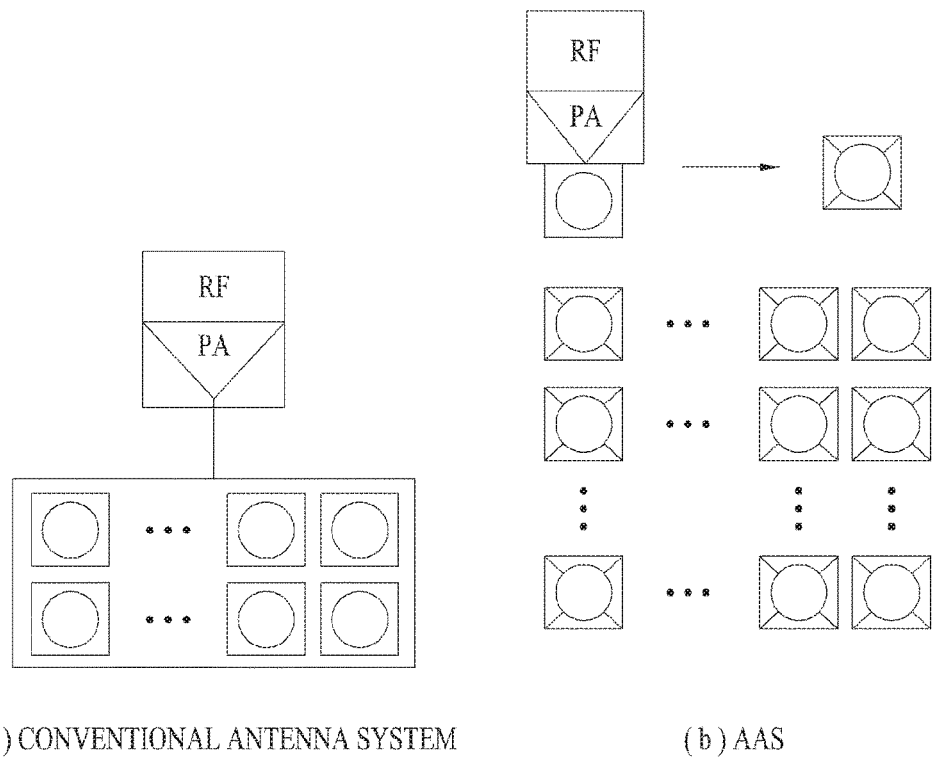
FIG. 13 is a view comparing an antenna system of the related art with an Active Antenna System (AAS).

FIG. 13 is a view comparing an antenna system of the related art with an AAS. Specifically, FIG. 13(a) illustrates the antenna system of the related art and FIG. 13(b) illustrates the AAS.

Referring to FIG. 13, as compared to the antenna system of the related art, each of a plurality of antenna modules includes a Radio Frequency (RF) module such as a Power Amplifier (PA), that is, an active device in the AAS. Thus, the AAS may control the power and phase on an antenna module basis.

In general, a linear array antenna (i.e. a one-dimensional array antenna) such as a ULA is considered as a MIMO antenna structure. A beam that may be formed by the one-dimensional array antenna exists on a Two-Dimensional (2D) plane. The same thing applies to a Passive Antenna System (PAS)-based MIMO structure. Although a PAS-based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved to an AAS, RF modules are configured independently even for vertical antennas. Consequently, vertical beamforming as well as horizontal beamforming is possible. This is called elevation beamforming.

The elevation beamforming may also be referred to as 3D beamforming in that available beams may be formed in a 3D space along the vertical and horizontal directions. That is, the evolution of a one-dimensional array antenna structure to a 2D array antenna structure enables 3D beamforming. 3D beamforming is not possible only when an antenna array is planar. Rather, 3D beamforming is possible even in a ring-shaped 3D array structure. A feature of 3D beamforming lies in that a MIMO process takes place in a 3D space in view of various antenna layouts other than existing one-dimensional antenna structures.

Figure 14:
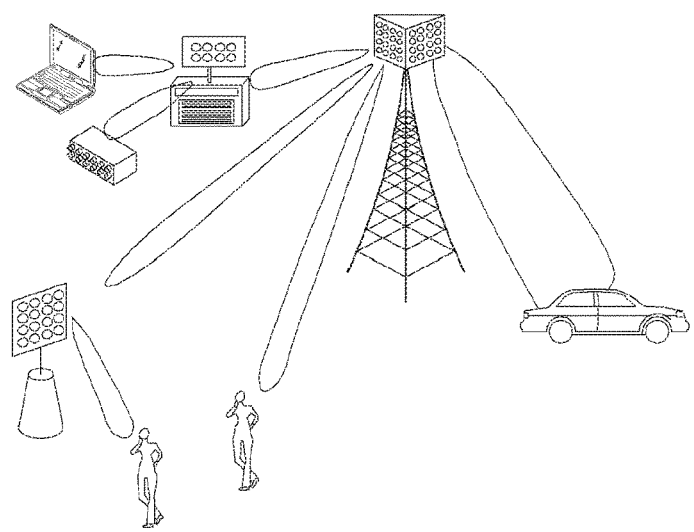
FIG. 14 illustrates an exemplary AAS-based User Equipment (UE)-specific beamforming.

FIG. 14 illustrates an exemplary UE-specific beamforming in an AAS. Referring to FIG. 14, even though a UE moves forward or backward from an eNB as well as to the left and right of the eNB, a beam may be formed toward the UE by 3D beamforming. Therefore, higher freedom is given to UE-specific beamforming.

Further, an outdoor to outdoor environment where an outdoor eNB transmits a signal to an outdoor UE, an Outdoor to Indoor (O2I) environment where an outdoor eNB transmits a signal to an indoor UE, and an indoor to indoor environment (an indoor hotspot) where an indoor eNB transmits a signal to an indoor UE may be considered as transmission environments using an AAS-based 2D array antenna structure.

Figure 15:
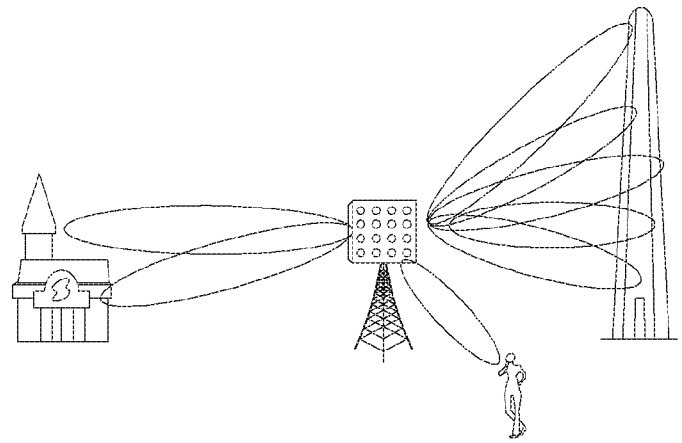
FIG. 15 illustrates an AAS-based two-dimensional beam transmission scenario.

FIG. 15 illustrates an AAS-based 2D beam transmission scenario.

Referring to FIG. 15, an eNB needs to consider vertical beam steering based on various UE heights in relation to building heights as well as UE-specific horizontal beam steering in a real cell environment where there are multiple buildings in a cell. Considering this cell environment, very different channel characteristics from those of an existing wireless channel environment, for example, shadowing/path loss changes according to different heights, varying fading characteristics, etc. need to be reflected.

In other words, 3D beamforming is an evolution of horizontal-only beamforming based on an existing linear one-dimensional array antenna structure. 3D beamforming refers to a MIMO processing scheme performed by extending to or combining with elevation beamforming or vertical beamforming using a multi-dimensional array antenna structure such as a planar array.

Meanwhile, a method of configuring all possible precoder sets and finding optimal PMI, RI and CQI in a 3D beamforming environment requires significantly high UE computation complexity for feedback information configuration. For example, on the assumption that a codebook for Vertical PMI (V-PMI) and Horizontal PMI (H-PMI) has a size of N bits per rank, the UE needs to perform a process of computing and comparing transmission quality (e.g. CQI, SNR, SINR, etc.) for precoder configuration by $N^2 R_{max}$. Here, $R_{max}$ is maximum transmission rank.

Figure 16:
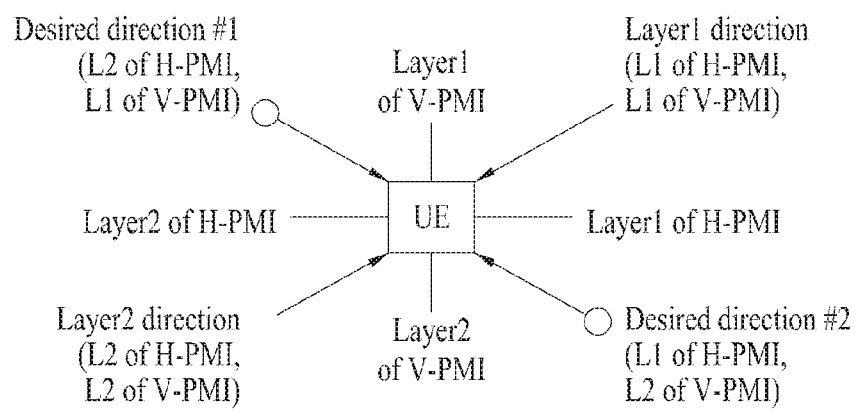
FIG. 16 is a diagram showing an example of generating mismatch between layers when a UE feeds back H-PMI and V-PMI.

FIG. 16 is a diagram showing an example of generating mismatch between layers when a UE feeds back H-PMI and V-PMI.

Upon designing a precoder for performing 3D beamforming, a transmitter shall concentrate transmit energy in an optimal direction in 3D space to concentrate energy of a signal on a receiver. V-PMI and H-PMI may be given 3D-PMIs in which each layer should be transmitted, that is, desired directions, as shown in FIG. 16. Here, L1 and L2 indicate layer indices.

Meanwhile, a UE and an eNB depend on a surrounding 3D wireless environment. Accordingly, when the UE feeds back only V-PMI and H-PMI of layer units, optimal 3D-PMI cannot be expressed. Alternatively, if the UE transmits V-PMI and H-PMI of layer units in each domain to obtain a received signal, the UE may obtain a pair of V-PMI and H-PMI in a direction different from that of optimal 3D-PMI. As a result, L1 and L2 of V-PMI and L1 and L2 of H-PMI for each transport layer may mismatch and the eNB may concentrate energy in the wrong direction, thereby causing transmission errors.

In order to solve mismatch between layers which may be generated when the UE feeds back H-PMI and V-PMI having a matrix shape, matching or permutation information between layers may be included in feedback information. In this case, the UE should configure a precoder by $$N^2 \sum_{r=1}^{R_{max}} r!$$

to compare transmission quality. Here, in 'r!', '!' means factorial.

As the number of above-described cases of configuring the precoder increases and evolution into a massive MIMO environment has been performed, the number of antennas has increased. Accordingly, computation for configuring a precoder to obtain transmission quality significantly increases. For example, when each of the number $N_v$ of vertical antennas and the number $N_h$ of horizontal antennas is 8, the UE should select a MIMO precoder for 64 transmit antennas and calculate transmission quality thereof, for each precoder configuration.

If complexity of a process of selecting a MIMO precoder based on N transmit antennas, M receive antennas and r transmit layers and calculating transmission quality thereof is C(N,M,r), in the above example, complexity of a conventional method is as follows.

$$N^2 \sum_{r=1}^{R_{max}} C(N_v \cdot N_h, N_r, r)$$ [Equation 8]

$$N^2 \sum_{r=1}^{R_{max}} r! C(N_v \cdot N_h, N_r, r)$$ [Equation 9]

As a feedback calculation and configuration method of maximally suppressing the above-described two causes of increased complexity, that is, increase in number of cases of configuring the precoder and increase in computation upon configuring each precoder, the following two methods were proposed.

<Feedback Calculation Method 1 of Related Art>

In the related art, a UE considered computation of PMI, RI and CQI according to the following steps 1 to 3.

Step 1: The PMI and the RI for the vertical-direction channel and the horizontal-direction channel are independently selected. That is, {V-PMI, V-RI} and {H-PMI, H-RI} are selected.

Step 2: 3D-RI (r*) is set to the larger value of V-RI and H-RI, as shown in Equation 10 below.

$$r^* = \max(V\text{-}RI, H\text{-}RI)$$ [Equation 10]

Step 3: x-RI (that is, one of V-RI and H-RI) is set to r* for the domain x corresponding to the smaller value of V-RI and H-RI, and x-PMI is found again under the condition that y-PMI (one of H-PMI and V-PMI) is fixed to the value obtained in Step 1 for the domain y corresponding to the larger value.

Complexity required for Step 1 is shown in Equation 11 below.

$$N^2 \sum_{r=1}^{R_{max}} C(N_v, N_r, r) + N \sum_{r=1}^{R_{max}} C(N_h, N_r, r)$$ [Equation 11]

In Step 2, the reason why 3D-RI is set to the maximum value of V-RI and H-RI will be described with reference to FIG. 17.

Figure 17:
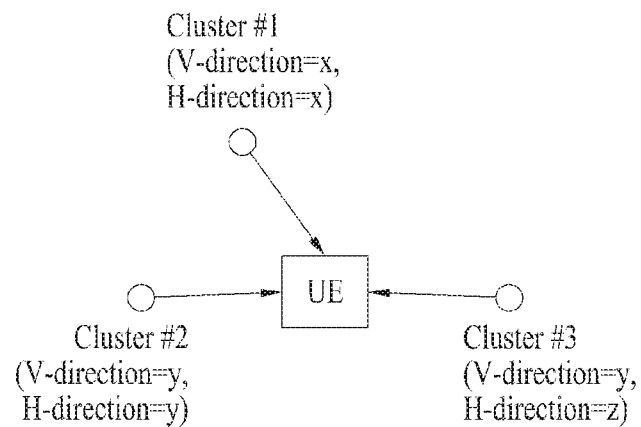
FIG. 17 is a diagram showing an example of a three-dimensional reception ray cluster environment.

FIG. 17 is a diagram showing an example of a three-dimensional reception ray cluster environment.

Referring to FIG. 17, assume that a UE is located in an environment in which three dominant ray clusters are present. In the figure, cluster #2 and cluster #3 are located at the same vertical position (or vertical angle) but have different horizontal positions (or horizontal angles). Accordingly, RI measured at a vertical-direction channel is likely to be 2 and RI measured at a horizontal-direction channel is likely to be 3. At this time, RI measured at a 3D channel is 3.

The example of FIG. 17 may be frequently generated in a real wireless communication environment. If a user is located behind a low building in a non-line of sight (NLOS) environment, a component (cluster #1) refracted and received from the top of the building and components (cluster #2, #3) received from the left and right sides of the building may be present. Although an example in which 3D-RI is equal to the larger value of V-RI and H-RI is described in FIG. 17, since more clusters may be present in the same direction, a relation of 3D-RI≥max (V-RI, H-RI) is satisfied (e.g. cluster #4 located at vertical position x and horizontal position z). However, in order to measure 3D-RI corresponding to a maximum value, since a process of configuring all 3D channels is necessary, the 3D-RI value is set to be equal to max (V-RI, H-RI) in the proposed method.

In Step 3, if x–RI=r*(the value determined in Step 2) for the domain x corresponding to the smaller value of V-RI and H-RI and the domain corresponding to the larger value of V-RI and H-RI is y, under the condition that y-PMI uses the value found in Step 1, the total 3D channel is configured to find x-PMI. At this time, necessary computation, that is, feedback information configuration complexity, is as shown in Equation 12 when 3D-RI is $r^*(1 \leq r^* \leq R_{max})$.

$$N \cdot C(N_v \cdot N_h, N_r, r^*) \qquad \text{[Equation 12]}$$

If various layer matching relations are supported, feedback information configuration complexity shown in Equation 13 below is obtained. In this case, information on optimal layer permutation may be included in feedback information.

$$N \cdot r^*! \cdot C(N_v \cdot N_h, N_r, r^*) \qquad \text{[Equation 13]}$$

Accordingly, feedback configuration method 1 of the related art has feedback information configuration complexity shown in Equations 14 and 15 below. In particular, Equation 14 shows complexity when layer permutation is not supported and Equation 15 shows complexity when layer permutation is supported.

$$N \sum_{r=1}^{R_{max}} C(N_v, N_r, r) + \qquad \text{[Equation 14]}$$

$$N \sum_{r=1}^{R_{max}} C(N_h, N_r, r) + N \cdot C(N_v \cdot N_h, N_r, r^*)$$

$$N \sum_{r=1}^{R_{max}} C(N_v, N_r, r) + \qquad \text{[Equation 15]}$$

$$N \sum_{r=1}^{R_{max}} C(N_h, N_r, r) + N \cdot r^*! \cdot C(N_v \cdot N_h, N_r, r^*)$$

If layer permutation is supported and r* is large, computation required for Step 3 may still be large. Accordingly, in order to further reduce computation in Step 3, one of the following methods is applicable.

(1) A layer (column or row of a precoding matrix) to be included in x-PMI is composed of only layers of x-PMI obtained in Step 1.

(2) A layer (column or row of a precoding matrix) to be included in x-PMI includes layers of x-PMI obtained in Step 1.

(3) Preferred PMI per rank is stored in Step 1 and then a preferred PMI value corresponding to r* is applicable as x-PMI in Step 3.

(4) A layer to be included in x-PMI is composed of layers of x-PMI obtained in Step 1 and layers of x-PMI corresponding to rank corresponding to (r*-x-RI).

The method (1) is derived from the fact that, as shown in FIG. 17, a preferred precoding vector in a domain in which the RI value is smaller is repeatedly used. If Method (1) is used, only to which layer a vector/matrix to be added corresponds is determined when layer permutation is not supported.

For example, in the case of x-PMI=[a b] obtained in Step 1 (a and b are N×1 column vectors, that is, precoding vectors for each layer) and r*=3 obtained in Step 2, a precoding matrix possible in Step 3 is as shown in Equations 16 and 17 below. Equation 16 shows the case where layer permutation is not supported and Equation 17 shows the case where layer permutation is supported.

$$[\text{a b a}], [\text{a b b}] \qquad \text{[Equation 16]}$$

$$[\text{a b a}], [\text{a a b}], [\text{b a a}], [\text{a b b}], [\text{b a b}], [\text{b b a}] \qquad \text{[Equation 17]}$$

Referring to Equations 16 and 17, it can be seen that the number of precoder cases to be compared is significantly reduced.

In addition, upon applying Method (1), a method of additionally feeding back an index for a vector/matrix corresponding to the deficient number of layers along with x-PMI obtained in Step 1 instead of a new index (x-PMI) corresponding to rank increased in Step 3 is applicable. In this case, a new index corresponding to rank 3 is not found and sent, but an index corresponding to a layer to be added upon rank 3 transmission, that is, a PMI index corresponding to rank 1, may be fed back along with the index corresponding to rank 2 obtained in Step 1. As another example of the index for the added vector/matrix, a method of bitmapping and configuring a row or column index to be repeatedly used in x-PMI may be considered. For example, [1 0] may be transmitted if the vector added in the above example is a and [0 1] may be transmitted if the vector added in the above example is b.

Unlike Method (1), Method (2) is applicable in order to further increase the candidate range of a vector or matrix corresponding to a layer to be added to further increase complexity as compared to Method (1) and increase performance or maintain orthogonality between layer precoders to be easily applied to a codebook corresponding to high rank. Even upon applying Method (2), as described above, a method of further feeding back an index for a vector/matrix corresponding to the deficient number of layers is applicable.

The method (3) is available when a transmission quality computation process for a matrix having a size of $N_v \times N_h$ is completely omitted in Step 3. That is, this method is most easily implemented but has lower performance than the other methods.

In the method 4, as in Method (1) or (2), the layer precoding vectors of x-PMI obtained in Step 1 are included and preferred PMI corresponding to the rank in Step 1 is used as layer precoding vectors corresponding to the increased rank (r*-x-RI). Referring to FIG. 17, the layer precoding vector to be added for the vertical domain is highly likely to be equal to preferred PMI of rank 1 in the vertical domain (corresponding to vertical position y in FIG. 17). To this end, in Method (4), complexity is further lowered. If Method (4) is used, when layer permutation is not supported, a transmission quality computation process for a matrix having a size of $N_v \times N_h$ may be completely omitted in Step 3. However, if layer permutation is supported, a transmission quality computation process for a matrix having a size of $N_v \times N_h$ is necessary. Even in this method, similarly to Method (1) or (2), a method of further feeding back an index for a vector/matrix corresponding to the deficient number of layers is applicable.

<Feedback Calculation Method 2 of Related Art>

The above-described feedback configuration method 1 of the related art relates to a method of reducing computation complexity while maintaining high rank most suitable for a real wireless environment. Feedback configuration method 1 of the related art has a limitation that a process of computing an added layer is necessary. In order to further decrease complexity at the sacrifice of transmission efficiency reduction, feedback calculation method 2 of the related art of computing PMI, RI and CQI as in Steps 1 to 3 below may be used.

Step 1: PMI and RI for the vertical-direction channel and the horizontal-direction channel are independently selected. That is, {V-PMI, V-RI} and {H-PMI, H-RI} are selected.

Step2: 3D-RI is set to the smaller value of V-RI and H-RI as shown in Equation 18 below.

$$r^* = \min(V\text{-}RI, H\text{-}RI) \quad [\text{Equation 18}]$$

Step3: y-RI=$r^*$ for the domain y corresponding to the larger value of V-RI and H-RI, and y-PMI is found again under the condition that x-PMI is fixed to the value obtained in Step 1 for the domain x corresponding to the smaller value.

It can be seen that feedback configuration method 2 is obtained by changing Steps 2 and 3 of the above-described feedback configuration 1.

More specifically, in Step 2, a precoder is configured so as to select only two of three clusters of FIG. 17. That is, data rank-2 transmission is performed using only a combination of cluster #1 and cluster #2 or cluster #1 and cluster #3. In Step 3, a process of reducing a precoding matrix corresponding to a domain in which RI is large to a small domain is performed. At this time, feedback information configuration complexity is as shown in Equations 19 and 20. In particular, Equation 19 shows complexity when layer permutation is not supported and Equation 20 shows complexity when layer permutation is supported.

$$N \sum_{r=1}^{R_{max}} C(N_v, N_r, r) + \quad [\text{Equation 19}]$$
$$N \sum_{r=1}^{R_{max}} C(N_h, N_r, r) + N \cdot C(N_v \cdot N_h, N_r, r^*)$$

$$N \sum_{r=1}^{R_{max}} C(N_v, N_r, r) + \quad [\text{Equation 20}]$$
$$N \sum_{r=1}^{R_{max}} C(N_h, N_r, r) + N \cdot r^*! \cdot C(N_v \cdot N_h, N_r, r^*)$$

Even in this case, in order to further reduce complexity of Step 3, one of the following methods is applicable.

(1) A layer (column or row of a precoding matrix) to be included in y-PMI is composed of only some layers of y-PMI obtained in Step 1.

(2) Preferred PMI per rank is stored in Step 1 and then a preferred PMI value corresponding to $r^*$ is applicable as y-PMI in Step 3.

In Method (1), only some layer precoding vectors obtained in Step 1 are used to configure a precoding matrix. This is obtained from the result observed in FIG. 17. In this case, instead of feedback of PMI corresponding to reduced rank, the index of a vector or matrix corresponding to a layer to be deleted may be fed back.

Similarly to Method (3) of feedback configuration method 1 of the related art, Method (2) is available when a transmission quality computation process for a matrix having a size of $N_v \times N_h$ is completely omitted.

Feedback configuration method 1 of the related art and feedback configuration method 2 of the related art were designed focusing on minimization of computation. Accordingly, in a real 3D wireless channel, a rank value equal to or less than a possible rank value is set, which will be described with reference to the drawing.

Figure 18:
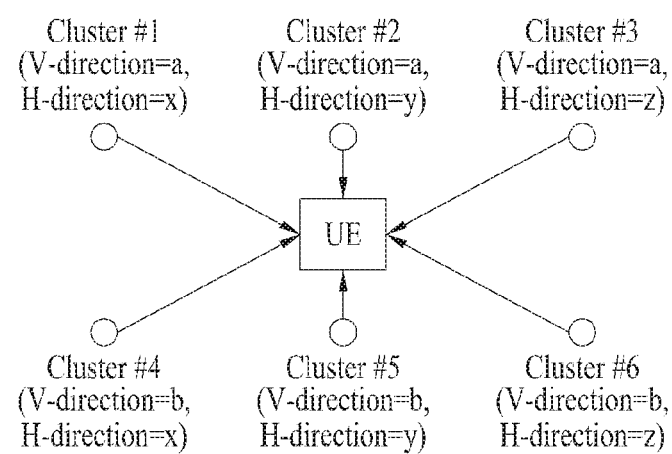
FIG. 18 is a diagram showing another example of a 3D reception ray cluster environment.

FIG. 18 is a diagram showing another example of a 3D reception ray cluster environment.

In the case of V-RI=2 and H-RI=3, although 3D-RI=3 may be present as shown in FIG. 17, 3D-RI=V-RI*H-RI=6 may be present as shown in FIG. 18. If an RI value is less than an optimal RI value, throughput deterioration cannot be avoided.

Accordingly, the present invention proposes computation of PMI, RI and CQI using the following method. In addition, in the present invention, assume that a reference signal (or a pilot signal) for vertical-direction channel measurement and a reference signal (or a pilot signal) for horizontal-direction channel measurement are received.

Step 1: V-RI which is RI for a vertical-direction channel and H-RI which is RI for a horizontal-direction channel are independently obtained.

Step2: 3D-PMI and 3D-RI are found with respect to rank values corresponding to a range from max(V-RI, H-RI) to (V-RI*H-RI).

Step3: A CQI value for a finally set {3D-PMI, 3D-RI} is found.

In Step 1, the same process as Step 1 of the feedback configuration of the related art is performed. In Step2, exhaustive search is performed with respect to PMI/RI sets for the RI corresponding to a range of max(V-RI, H-RI)≤RI≤(V-RI*H-RI) as in an existing full search method. That is, PMI/RI capable of obtaining optimal performance is detected with respect to PMI/RI sets for the RI corresponding to the range of max(V-RI, H-RI)≤RI≤(V-RI*H-RI).

Transmittable maximum rank may be restricted by the number of RF chains (TXRU) or antennas of the eNB/UE. If rank maximally implementable according to the situation of the UE or the eNB is present, search is performed up to the maximally implementable rank in Step 2. That is, max(V-RI, H-RI)≤RI≤min({V-RI*H-RI}, RI_max). Here, RI_max corresponds to maximally implementable rank in terms of the category of the UE or in implementation.

The proposed technology reduces the size of the rank candidate as compared to the existing full search method for the 3D PMI/RI and thus computation can be reduced. In addition, more accurate rank can be calculated to increase throughput as compared to the feedback configuration methods of the related art. In particular, the number of PMI/RI candidates can be reduced and computation can be reduced as compared to the full search method, but optimal 3D-PMI/RI can be found and thus performance is the same as the full search method. The PMI/RI/CQI may be computed in units of whole frequency band or subband selected by the eNB or the UE. In addition, the CQI may be independently computed and applied per codeword.

The proposed method is applicable upon computing CQI/PMI/RI per cell or transmission point or carrier in a communication environment in which a plurality of cells or transmission points cooperates and in a carrier aggregation environment.

Figure 19:
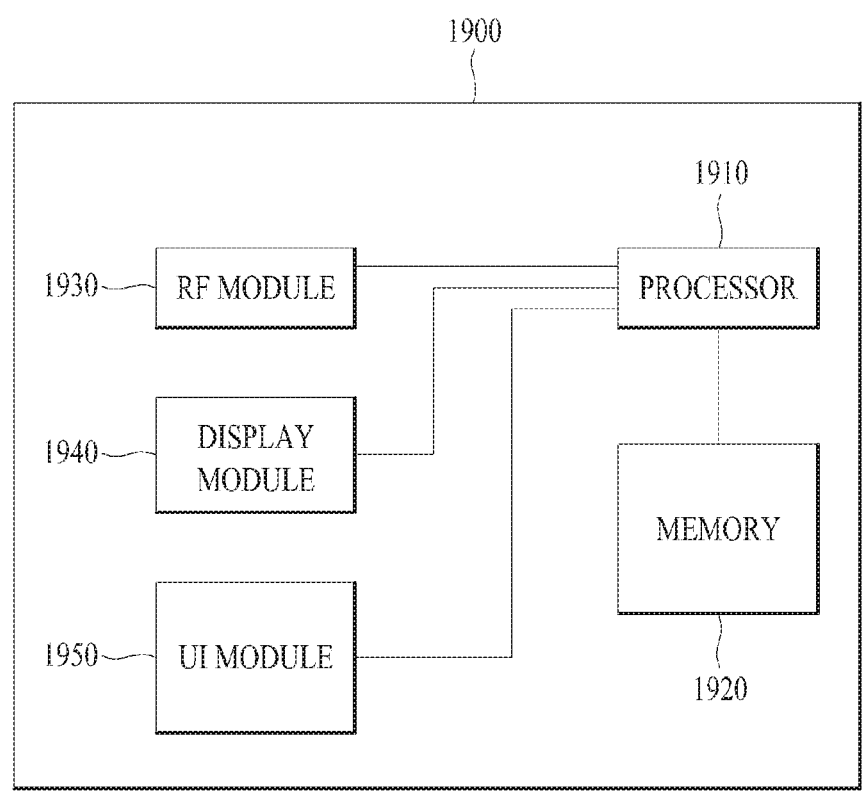
FIG. 19 is a block diagram of a communication apparatus according to an embodiment of the present disclosure.

FIG. 19 is a block diagram of a communication apparatus according to an embodiment of the present disclosure.

Referring to FIG. 19, a communication apparatus 1900 includes a processor 1910, a memory 1920, an RF module 1930, a display module 1940, and a User Interface (UI) module 1950.

The communication device 1900 is shown as having the configuration illustrated in FIG. 19, for the convenience of description. Some modules may be added to or omitted from the communication apparatus 1900. In addition, a module of the communication apparatus 1900 may be divided into more modules. The processor 1910 is configured to perform operations according to the embodiments of the present disclosure described before with reference to the drawings. Specifically, for detailed operations of the processor 1910, the descriptions of FIGS. 1 to 18 may be referred to.

The memory 1920 is connected to the processor 1910 and stores an Operating System (OS), applications, program codes, data, etc. The RF module 1930, which is connected to the processor 1910, upconverts a baseband signal to an RF signal or downconverts an RF signal to a baseband signal. For this purpose, the RF module 1930 performs digital-to-analog conversion, amplification, filtering, and frequency upconversion or performs these processes reversely. The display module 1940 is connected to the processor 1910 and displays various types of information. The display module 1940 may be configured as, not limited to, a known component such as a Liquid Crystal Display (LCD), a Light Emitting Diode (LED) display, and an Organic Light Emitting Diode (OLED) display. The UI module 1950 is connected to the processor 1910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the example of applying a method of generating channel state information for three-dimensional multiple input multiple output (MIMO) in a wireless communication system and a device therefor to a 3GPP LTE system was described in the above description, the present invention is applicable to various wireless communication systems in addition to 3GPP LTE.

The invention claimed is:

1. A method for generating channel state information for multiple input multiple output (MIMO) based beamforming by a user equipment (UE) in a wireless communication system, the method comprising:
   receiving a first pilot signal and a second pilot signal from a base station;
   selecting a first rank indicator (RI) based on the first pilot signal and selecting a second RI based on the second pilot signal;
   configuring a RI search range for a three-dimensional (3D) channel based on the first RI and the second RI; and
   selecting a RI for the 3D channel and a precoder corresponding to the RI for the 3D channel within the RI search range,
   wherein, in the RI search range, a larger value of the first RI and the second RI is configured as a lower limit and a maximally implementable RI of the UE or a product of the first RI and the second RI is configured as an upper limit.

2. The method according to claim 1, wherein the first pilot signal and the second pilot signal correspond to a vertical-direction channel and a horizontal-direction channel, respectively.

3. The method according to claim 1, further comprising:
   calculating a channel quality indicator on the assumption that the RI for the 3D channel and the precoder corresponding to the RI for the 3D channel are applied; and
   reporting, to the base station, the channel state information including the RI for the 3D channel, the precoder corresponding to the RI for the 3D channel and the channel quality indicator.

4. A user equipment (UE) device in a wireless communication system, the UE comprising:
   a wireless communication module configured to receive a first pilot signal and a second pilot signal from a base station;
   a processor configured to select a first rank indicator (RI) based on the first pilot signal and selecting a second RI based on the second pilot signal;
   wherein the processor configures a RI search range for a three-dimensional (3D) channel based on the first RI and the second RI and selects a RI for the 3D channel and a precoder corresponding to the RI for the 3D channel within the RI search range, and wherein, in the RI search range, a larger value of the first RI and the second RI is configured as a lower limit and a maximally implementable RI of the UE or a product of the first RI and the second RI is configured as an upper limit.

5. The UE according to claim 4, wherein the first pilot signal and the second pilot signal correspond to a vertical-direction channel and a horizontal-direction channel, respectively.

6. The UE according to claim 4, wherein the processor calculates a channel quality indicator on the assumption that the RI for the 3D channel and the precoder corresponding to the RI for the 3D channel are applied and controls the wireless communication module to report, to the base station, the channel state information including the RI for the 3D channel, the precoder corresponding to the RI for the 3D channel and the channel quality indicator.

* * * * *